May 7, 1968     G. J. JANKE ET AL     3,381,740

FOUNDRY MOLDING MACHINE

Filed July 7, 1965     3 Sheets-Sheet 1

INVENTORS.
GILBERT J. JANKE
WARREN A. BLOWER
BY
Oberlin, Maky & Donnelly
ATTORNEYS INVENTORS.
GILBERT J. JANKE
WARREN A. BLOWER
BY Oberlin, Maky & Donnelly
ATTORNEYS INVENTORS.
GILBERT J. JANKE
WARREN A. BLOWER
BY
Oberlin, Maky & Donnelly
ATTORNEYS

United States Patent Office 3,381,740
Patented May 7, 1968

3,381,740
FOUNDRY MOLDING MACHINE
Gilbert J. Janke, Parma, and Warren A. Blower, Brecksville, Ohio, assignors to The Osborn Manufacturing Company, Cleveland, Ohio, a corporation of Ohio
Filed July 7, 1965, Ser. No. 469,983
9 Claims. (Cl. 164—173)

ABSTRACT OF THE DISCLOSURE

A pneumatic foundry molding machine utilizing a squeeze piston-cylinder assembly employing tandem pressure receiving surfaces interconnected by polished guide rods extending through a partition, whereby the larger diameter surfaces of the assembly need not be highly finished, the force exerted by the tandem pressure receiving surfaces being additive so that greater squeeze force is obtained with a smaller size assembly.

This invention relates generally as indicated to a foundry molding machine and more particularly to a fluid pressure squeeze molding machine capable of obtaining substantially increased squeeze pressures without a corresponding increase in the size of the squeeze pistons and cylinders employed.

Heretofore, to obtain high squeeze pressure in a foundry molding machine, high pressure hydraulic systems have been required or in pneumatic systems, large diameter, carefully machined and finished piston and cylinder assemblies have been necessary. Hydraulic machines are slower acting and, of course, much more expensive than pneumatic machines primarily because of the high cost components of a hydraulic system including such things as seals, valves, pumps, reservoirs, and the like. To obtain high pressures in a pneumatic machine, large areas are required resulting in carefully finished parts such as pistons and cylinders of extreme size and accordingly cost. Maintenance and wear problems are acute in a hydraulic machine because of the intricacies and variety of components required and in large cylinder pneumatic machines, the replacement of seals and attendant wear in large diameter cylinders and pistons is a continuing problem. Moreover, it is extremely difficult accurately to machine and finish a large diameter bore and a corresponding piston which is guide slided therein and maintain a lasting dependable high pressure machine. The problem stated then is the provision of a high pressure squeeze molding machine which will not require complex hydraulic systems or large diameter pneumatic squeeze pistons.

It is accordingly a principal object of the present invention to provide a high pressure squeeze foundry molding machine which doesn't require hydraulic systems or large diameter penumatic squeeze piston-cylinder assemblies.

A further principal object is the provision of such machine which is of a rugged and simplified construction not requiring extremely large carefully machined parts.

Another object is the provision of a pneumatic squeeze foundry molding machine where the squeeze pressure obtained is not limited to the diameter or lateral size of the squeeze piston-cylinder assembly.

Still another object is the provision of a simplified pneumatic foundry molding machine wherein the squeeze piston-cylinder assembly does not require to be accurately machined and polished to provide a slide-guide surface.

Yet another object is the provision of a foundry molding machine utilizing a tandem squeeze piston arrangement to increase the squeeze pressure obtainable without increasing the bulk of the piston-cylinder assembly.

A still further object is the provision of a foundry molding machine utilizing a shuttling overhead squeeze piston-cylinder assembly of high capacity yet relatively less mass.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 3 is an enlarged vertical section of one form of squeeze piston-cylinder assembly which may be used in the machine illustrated in FIGS. 1 and 2;

FIG. 4 is a vertical section similar to FIG. 3 of another embodiment of squeeze piston-cylinder assembly which may also be used in the machine illustrated in FIGS. 1 and 2.

Overhead squeeze machine

Figure 1:
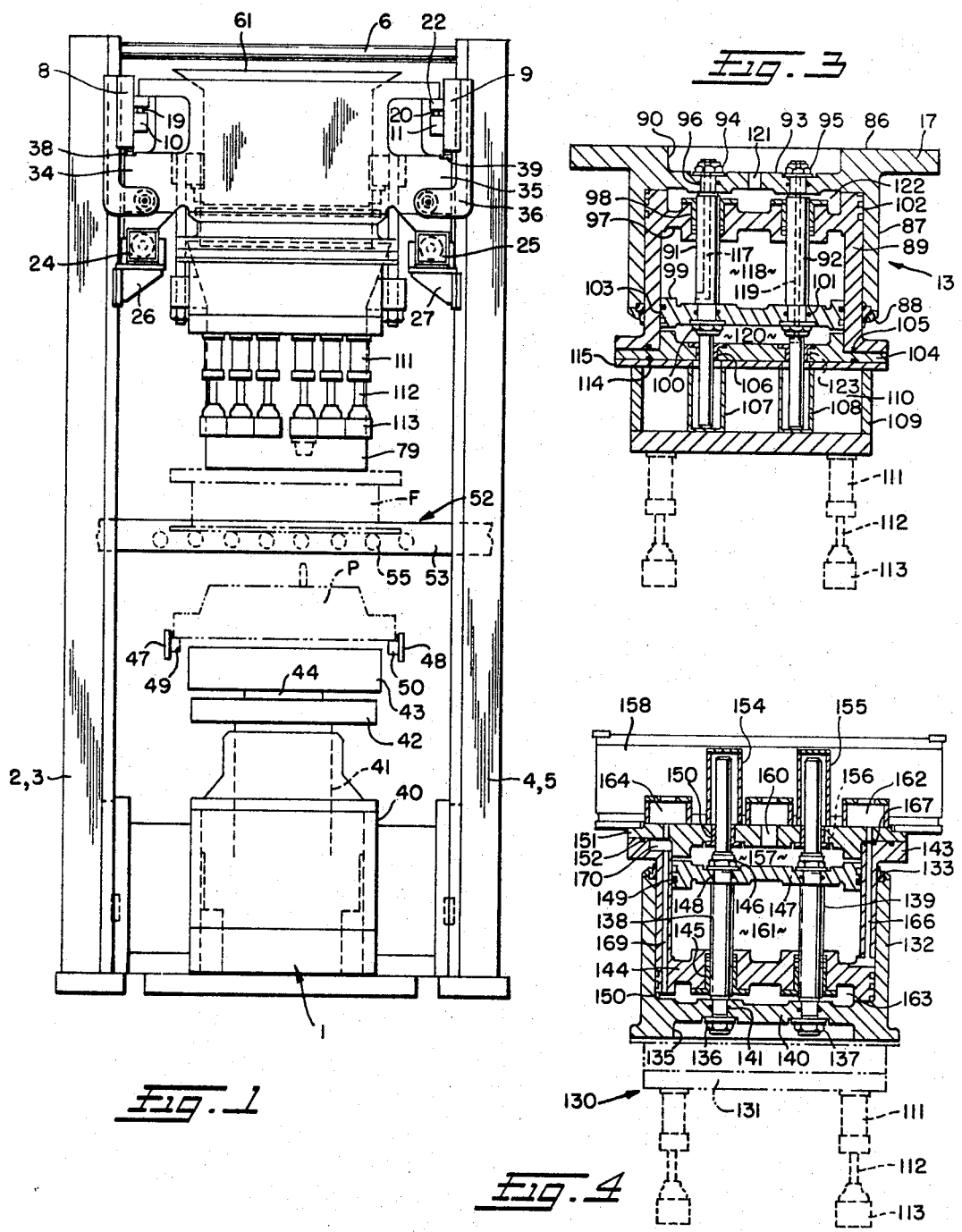
FIG. 1 is a side elevation of one form of a foundry molding machine in accordance with the present invention.
Figure 2:
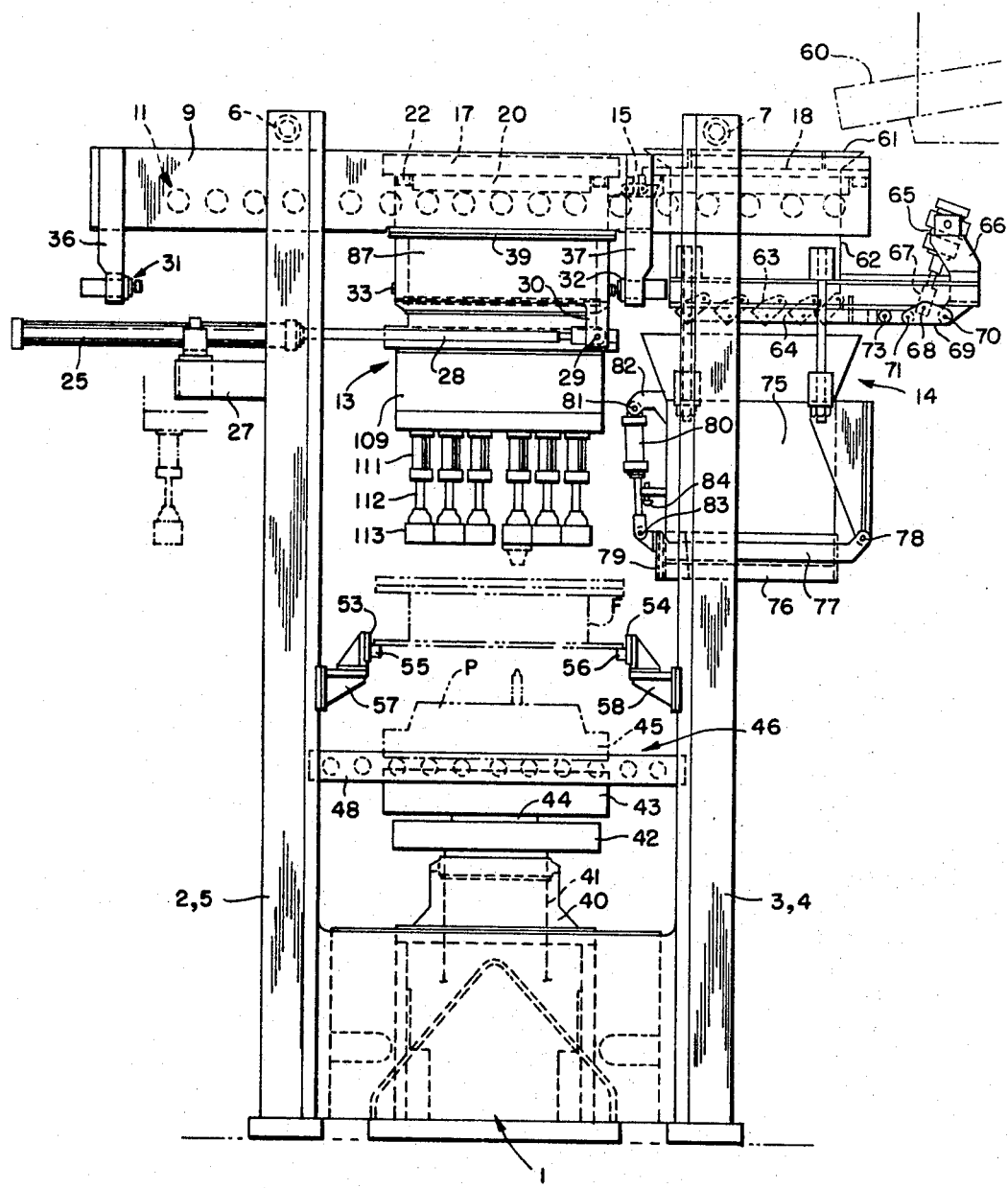
FIG. 2 is an end elevation of the machine shown in FIG. 1.

Referring now to FIGS. 1 and 2 there is illustrated an overhead squeeze machine in accordance with the present invention which comprises a frame including a base 1 having four vertical posts or frame members 2, 3, 4 and 5 at each corner thereof. Transverse tie bars 6 and 7 join the frame members 2 and 5 and 3 and 4, respectively, at the top of the machine. Extending between the verticals 2 and 3, and 4 and 5, respectively, are plates 8 and 9, each having on the inside thereof a row of projecting rollers as shown at 10 and 11, respectively. In this manner the vertical frame members 2 through 5 are connected at the bottom by the base 1, and at the top by the transverse tie bars 6 and 7 as well as the roller conveyor bars 8 and 9.

Mounted on the rows of rollers 10 and 11 are two interconnected carriages 13 and 14 which may be termed respectively, the squeeze-head carriage and the sand supply carriage. Such carriages may be interconnected by link shown generally at 15, and both are provided with laterally directed top flanges as indicated at 17 and 18 which overlie the rows of rollers 10 and 11. The underside of the edges of such flanges are provided with rails as seen at 19 and 20 in FIG. 1 supporting the carriage on the respective row of rollers. Each carriage may be provided with corner rollers as seen at 22 having their axes vertically disposed to engage and ride against the insides of the rails 8 and 9. In this manner both carriages are firmly supported by the conveyor rollers for horizontal shuttling movement back and forth at the top of the machine.

Such shuttling movement of the two carriages 13 and 14 is obtained by a pair of piston-cylinder assemblies shown at 24 and 25 mounted on brackets 26 and 27 on the vertical frame members 2 and 5, respectively. The rods 28 of the piston-cylinder assemblies are connected at 29 to brackets 30 extending downwardly from each side of the carriage 13. The extent of shuttling movement is limited by pairs of adjustable shock absorbers 31 and 32 which are operative to engage the stop plates or buttons 33 on lateral projections of the end plates as shown at 34 and 35 on the carriage 13. The stops 31 are mounted on L-shaped brackets 36 mounted on the ends of the rails 8 and 9, and the stops 32 are mounted on similar brackets 37. The carriage 13 also includes laterally projecting rails 38 and 39 which underlie the rails 8 and 9, respectively, preventing the carriage 13 from moving upwardly.

In the base there is provided an elevator or clamp cylinder 40 having a piston 41 therein operative to elevate table 42 having jolt table 43 mounted thereon by means of a jolt piston 44 telescoped within the clamp piston 41. Elevation of the table 42 and, of course, the jolt table 43 supported thereon will pick up a pattern stool 45 from pattern change conveyor 46. The latter is comprised of rails 47 and 48 having inwardly projecting rows of conveyor rollers 49 and 50, respectively. Continued elevation of the table 43 will pick up the pattern stool 45 from the conveyor 46 and the pattern stool 45 will then pick up a flask F from a flask conveyor 52. The latter is similarly comprised of rails 53 and 54 having inwardly projecting rows of rollers 55 and 56, thereon. Such rails 53 and 54 are mounted on brackets 57 and 58, respectively, extending between the vertical frame members 2 and 5, and 3 and 4, respectively.

The flask F may be in the form of a box, flanged both top and bottom, which will enclose the pattern P projecting upwardly from the pattern stool 45, and when thus assembled, the pattern and flask will form an upwardly opening mold box with the flask elevated slightly from the rollers 55 and 56. When the flask is thus positioned, the table 42 may be locked in its vertically elevated position by the locking mechanisms shown, for example, in applicants' copending application entitled, "Foundry Molding Machine," filed July 7, 1965, Ser. No. 469,981, or a hydraulic locking mechanism may be employed as shown, for example, in the copending application of Leon F. Miller et al., Ser. No. 252,644, filed Jan. 21, 1963, entitled, "Molding Machine," now Patent No. 3,205,542.

To fill the mold box with foundry molding sand, sand may be supplied from a vibratory feed conveyor 60 to the flared top 61 of measuring box 62 forming a part of the carriage 14. The bottom of the measuring box 62 is provided with horizontally pivoted louver gates 63 operated by horizontal movement of bar 64 which is in turn operated by piston-cylinder assembly 65 mounted on bracket 66. The rod 67 of the piston-cylinder assembly is pivoted at 68 to a toggle linkage 69. The linkage 69 is pivoted at 70 to the bracket 66 and at 71 to an intermediate link 72 pivoted at 73 to the operating bar 64.

The pivots 73, 71 and 70 form the three pivots of the toggle linkage with the pivot 71 moving slightly over-center when the piston-cylinder assembly 65 is extended. This toggle linkage ensures that the louver gates 63 will remain closed regardless of the fluid pressure in the piston-cylinder assembly 65. When the piston-cylinder assembly 65 is retracted, the link 69 is pivoted upwardly about the pivot 70 and the toggle lock is broken moving the operating rod 64 to the right or horizontally as seen in FIG. 2, pivoting the louvers 63 to an open position to dump the sand within the measuring box into the chute 75. It will, of course, be appreciated that the carriage 14 will be shuttled to a position above the assembled mold box to the opening of the louvers 63 by retraction of the piston-cylinder assemblies 24 and 25.

The chute 75 is provided with a bottom portion 76 telescoped over the bottom of the chute and mounted on frame 77 which is pivoted at 78. A plow or strike-off blade 79 is provided on one end of the frame and the vertical position of the strike-off blade may be adjusted by piston-cylinder assembly 80, the blind end thereof being pivoted at 81 to bracket 82, and the rod end being pivoted at 83 to the frame 77. After the carriage 14 is shuttled to a position over the flask F, the piston-cylinder assembly 80 will be extended so that the lower portion 76 of the chute substantially completely encloses the space between the top of the flask F and the measuring box 62. After the sand is dumped within the flask, the piston-cylinder assembly 80 may be retracted and an adjustable stop 84 will control the vertical position of the strike-off blade 79 so that extension of the piston-cylinder assemblies 24 and 25 will then strike from the top of the flask any excess sand. The carriage 14 is then returned to its position beneath the vibratory feed conveyor 60 and a measured amount of sand is then placed within the measuring box 62. The louvers, of course, at this time will be closed and the positioning of the carriage 14 as shown in FIG. 2 then places automatically the squeeze-head carriage 13 above the now filled mold box.

Continued cycling of the machine will now operate the jolt mechanism, if desired, initially to compact the sand and the squeeze head within the carriage 13 may then be caused to descend to obtain a high pressure final ramming of the sand within the flask against the pattern. When this is accomplished, the squeeze head is retracted, the table is unlocked and caused to descend depositing the flask F with the mold now rammed therein on the conveyor rollers 55 and 56, and continued lowering of the table draws the pattern P from the mold. The finished mold within the flask is then shuttled from the machine and a new flask is brought into position and the cycle is repeated. During the cycle, the pattern stool 45 may be lowered onto the pattern change conveyor 46 conveniently to effect a change in pattern.

*Overhead squeeze head FIG. 3 embodiment*

The FIG. 3 embodiment of the overhead squeeze head may comprise a main upper frame 86 which includes the laterally projecting flanges 17 and a downwardly projecting cylinder 87. A split-wiper type seal 88 is mounted on the bottom of the cylindrical portion 87 and provides an economical sliding seal with cylinder 89 mounted within the cylinder 87. An annular recess 90 is provided in the member 86 and stepped rods as shown at 91 and 92 are fastened to the web 93 of the member 86 beneath the recess 90 by lock nuts 94 and 95 holding the shoulders of the rods 91 and 92 against the bottom of the web 93 and suitable O-rings 96 may be provided surrounding the reduced diameter portion of such rods within the web. Although only two rods are shown in the sectional view, the illustrated embodiments actually employ four.

The cylinder 89 is provided with a web or piston portion 97 provided with packing glands 98 for the enlarged polished portions of the rods 91 and 92 passing therethrough so that the piston 97 will be slide guided thereby. The lower ends of the rods are also shouldered and secured to fixed piston or partition 99 by nuts 100 and again O-rings 101 are provided to seal the rods with respect to the partition 99. Piston rings or seals may be provided as shown at 102 and 103 sealing the cylinder 89 within the cylinder 87 and the partition 99 within the cylinder 89, respectively. A cast steel end closure or piston 104 is mounted on the lower end of the cylinder 89 and a large O-ring seal 105 may be provided therebetween. The closure 104 is provided with an upstanding flange which fits within the cylinder 89 and also extends to the periphery of the laterally extending flange on the bottom of the cylinder 89. Fasteners not shown extending through the laterally projecting portions or flanges of the parts may be employed to hold the same together.

The lower reduced diameter end portions of the rods 91 and 92 extend through bushings 106 in the closure 104 and into partitioned chambers 107 and 108 in oil reservoir 109.

The chamber 110 in the reservoir 109 may be employed in a closed system to supply oil to a plurality of piston-cylinder assemblies 111 mounted on the bottom of the reservior with the downwardly projecting piston rods 112 having squeeze feet or members 113 mounted thereon. Each of the piston-cylinder assemblies 111 is manifolded to the other so that as the squeeze head moves downwardly, the feet 113 will engage the top of the sand within the flask and the squeeze members will then retreat depending upon the resistance encountered. Reference may be had to the copending application of Edmond K. Hatch et al., Ser. No. 127,616, entitled "Squeeze Molding Machine" now Patent No. 3,220,066 for a disclosure of the manner in which a plurality of such squeeze members 113 may be employed in a foundry molding machine. In this manner the high squeeze pressure obtained may be substantially uniformly distributed over the top of the mold sand and the members 113 over the portions of the mold having the greatest sand depth will penetrate furthest into the flask. A large diameter O-ring seal 114 may be provided between the top plate 115 of the reservoir 109 and the bottom of the closure 104.

A vertically extending port 117 is provided in the rod 91 communicating with the chamber 118 and a vertically extending port 119 in the rod 92 communicates with the chamber 120. A port 121 is provided in the top web 93 communicating with the chamber 122 and small passages may be provided in the piston 104 extending from the chamber 120 to the chambers within the partitions 107 and 108 enclosing the lower reduced diameter ends of the rods 91 and 92 as shown at 123.

To obtain a high pressure squeeze, air at approximately 100 p.s.i. is supplied to the ports 121 and 119 in the rod 92 to pressurize chambers 122 and 120, respectively. The squeeze head will then descend with the squeeze members 113 engaging the sand filled flask. It can now be seen that the air pressure in the chamber 122 is acting on an area determined by the outside diameter of the cylinder 89, minus, of course, the areas of the rods within the chamber 122. The pressure in the chamber 120 is acting on an area determined by the inside diameter of the cylinder 89, and due to the passages 123 leading to the partitions 197 and 108, the diameter of the rods will not reduce the area on which the air pressure is acting. Thus, the total force or pressure times area is almost twice that which could be obtained with but one squeeze cylinder of the size shown. It can also be seen that the cylindrical interface between the cylinders 87 and 89 is not a slide guide surface since the vertical movement of the cylinder 89 is guided by the polished large diameter portions of the rods 91 and 92 and accordingly such large diameter cylindrical portions need not be precisely machined, ground or polished.

After the high pressure squeeze operation has been accomplished, the chambers 122 and 120 may be vented through the respective ports 121 and 119 and air at reduced pressure may be supplied through the port 117 in the rod 91 to the chamber 118 to elevate the squeeze piston assembly.

*Overhead squeeze piston (FIG. 4 embodiment)*

Referring now to FIG. 4 there is illustrated a slightly modified form of overhead squeeze piston which may be characterized as similar to that of FIG. 3, but inverted. The squeeze head referred to generally as 130 includes a plurality of squeeze piston-cylinder assemblies 111 with squeeze members 113 being mounted on the rods 112 thereof and such piston-cylinder assemblies 111 are mounted on the underside of the somewhat more shallow oil reservoir 131. The squeeze head is mounted on the underside of upstanding cylinder 132 which is similar in structure to the cylinder 87 of the FIG. 3 embodiment. A split-wiper seal 133 at the top of the cylinder 132 slidingly engages the cylindrical wall of cylinder 134. The bottom of the cylinder 132 acts as a piston and is provided with a recess 135 providing clearance for fasteners 136 and 137 on the reduced diameter lower end portions of rods 138 and 139. Again, there may be four rods while only two are shown. Such rods extend through the web portion or piston 140 at the bottom of the cylinder 132 and suitable O-rings 141 may be provided surrounding such shaft portions.

The cylinder 134 includes a top flange 143 and a bottom partition 144 slidably receiving the enlarged, polished portions of the rods 138 and 139 with packing glands being provided therearound as shown at 145. Within the cylinder 134 and fixedly secured to the rods 138 and 139 by fasteners 146 is piston 147. O-rings 148 may be provided sealing the reduced diameter portions of the rods 138 and 139 extending through the piston 147. Piston rings as shown at 149 and 150 may be provided to obtain a sliding pneumatic seal between the piston 147 and the inside of the cylinder 134, and the exterior of the cylinder 134 and the inside of the cylinder 132, respectively. The upper ends of the rods 138 and 139 extend through bushings 150 in the top closure member 151 which is mounted on the top flange 143 or the cylinder 132. A large diameter O-ring 152 may be provided sealing the two members together. The upper ends of the rods extend into housings 154 and 155 mounted on the top member 151 and such housings may be connected by fluid passages 156 to the chamber 157 between the piston 147 and the top member 151. The entire assembly may be mounted on frame 158 projecting laterally to overlie the inwardly projecting rollers on the rails 8 and 9.

The top chamber 157 may be supplied with air under pressure through port 160 and the intermediate chamber 161 may be supplied through port 162. The bottom chamber 163 may be supplied through port 164. Communicating with the port 162 may be three fairly closely spaced vertical passages 166 in the wall of the cylinder 134 and small O-rings 167 may be provided around each such passage between the member 151 and the top flange 143 of the cylinder 132. At the opposite side of the assembly, the port 164 communicates with eight vertically extending somewhat smaller passages 169 manifolded by cored slot 170 in direct communication with the port 164 and leading to the bottom chamber 163.

In operation, air at approximately 100 p.s.i. may be supplied to the ports 160 and 164 to pressurize the chambers 157 and 163 to cause the head 130 to descend to obtain maximum squeeze pressure. Again, it can be seen that the force obtained will be equal to the pressure times an area dependent upon the diameter of the piston 147 plus the pressure times an area dependent upon the inside diameter of the cylinder 132 (outside diameter of cylinder 134) minus the area of the rods extending through the chamber 163. When such pressure is applied, the cylinder 132 descends as does the piston 147 which is connected to the piston portion 140 of the cylinder 132 for movement therewith by the guide rods 138 and 139. After the squeezing operation is complete, air is supplied to port 162 to pressurize chamber 161 at approximately 20 pounds per square inch and the chambers 157 and 163 are vented so that the cylinder 132 and piston 147 will be elevated.

It will be appreciated that in the squeezing operation, with the embodiments illustrated in FIGS. 3 and 4, three pressure selections are actually available. For example: the port 160 may pressurize the smaller diameter chamber 157; the port 164 may pressurize the somewhat larger diameter chamber 163; or both chambers 157 and 163 may be pressurized simultaneously to obtain a high pressure squeeze. If, for example, the piston 147 is 36" in diameter, it will have an area of about 1018 square inches and if the piston 144 has a diameter of 42," it will have an area of about 1385 square inches, or subtracting the area of the rods, an effective area of about 1307 square inches. Accordingly, the following chart illustrates the approximate variations in force obtainable by the three pressure selections:

SQUEEZE PRESSURE—12" MAX. ST.

[Based on operating pressure of 100 p.s.i. and 16,000 lb. wt. of sqz. head ass'y]

| 3 Pressure Selections | | |
|---|---|---|
| 36" cyl. | 42" cyl. | 36" and 42" cyl. |
| Low. | Medium. | High. |
| 117,500 lbs. | 146,500 lbs. | 248,000 lbs. |

Based upon the same scale, the chamber 161 in FIG.

4 will have an effective area of about 940 square inches so that it will be seen that 20 pounds per square inch will provide an effective force upwardly of around 18,000 pounds which is effective to elevate the 16,000 pound weight of the squeeze head assembly.

FIG. 5 embodiment

Figure 5:
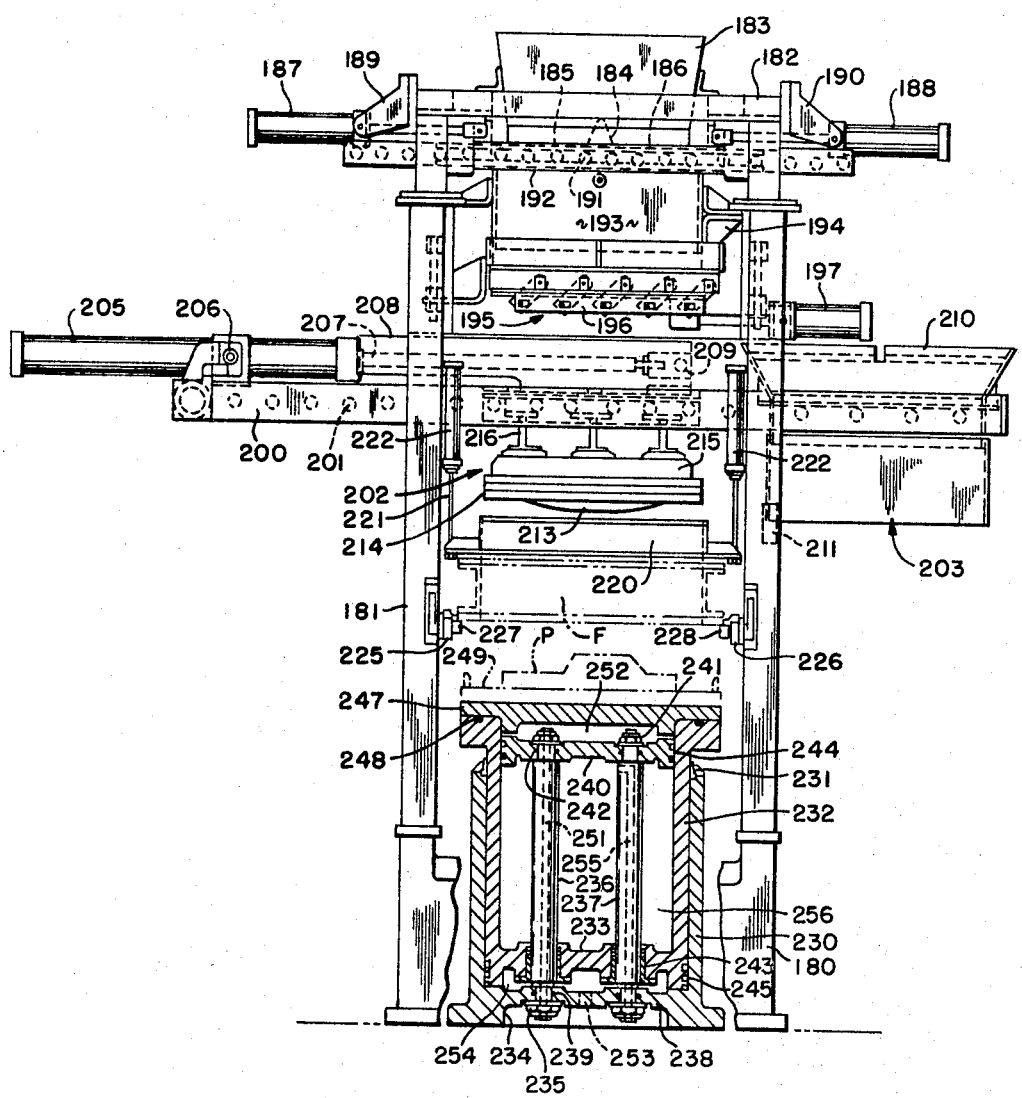
FIG. 5 is an end elevation of another type of foundry molding machine partially broken away and in section to illustrate the tandem-squeeze piston table.

Referring now to FIG. 5, there is illustrated a different type of foundry molding machine which also incorporates the present invention. The machine includes a base 180 having four corner upstanding posts 181 which support at the top of the machine on cross-frames 182, a gravity fill sand hopper 183. The hopper may be divided at the center by a deflector 184 providing two drop openings therefrom which may be closed by cut-off plates 185 and 186 operated by piston-cylinder assemblies 187 and 188, respectively, mounted on brackets 189 and 190. Such cut-off plates may be mounted for horizontal shuttling movement on rollers 191 mounted on rails 192 extending across the machine. When the cut-off plates are retracted, the sand falls into a measuring box 193 supported on brackets 194 from the posts 181. At the bottom of the measuring box is a louver gate 195 operated by horizontal reciprocation of rod 196 in turn actuated by the piston-cylinder assembly 197.

A pair of rails 200 extend across the machine supported on the posts 181 and inwardly projecting rows of rollers 201 support an interconnected squeeze head carriage 202 and sand chute carriage 203 for horizontal shuttling movement. Such shuttling movement is obtained by piston-cylinder assembly 205 pivoted at 206 upon the ends of the rails 200. The rod 207 of the assembly 205 extends beneath a hood 208 to protect the former in its extended position from falling said and dirt and such rod is connected at 209 to the squeeze head carriage assembly 202. The sand chute carriage 203 simply includes a chute having a funnel top 210 with a strike-off blade 211 mounted on one end.

The squeeze head assembly 202 is illustrated as being of the diaphragm type and may include a plurality of thick diaphragm 213 clamped by rings 214 around the periphery of a fluid filled cavity 215. The cavity frame 215 may be mounted by I-beams 216 to the top of the carriage riding on the rollers 201 and when the squeeze head assembly is in the squeeze position shown, it will underlie fixed framing of the machine connected to the posts 181 preventing vertical upward movement of the squeeze head. A fill frame 220 adapted to telescope over the rings 214 is mounted on the rods 221 of pneumatic piston-cylinder assemblies 222 urging the fill frame resiliently to its lowermost position.

Rails 225 and 226 are mounted on the posts 181 and are provided with inwardly projecting rows of rollers shown at 227 and 228, respectively, to support flask F for movement into and out of the machine.

The base of the machine includes an upstanding cylinder 230 having a split-wiper seal 231 at the top thereof providing a sliding seal with inner cylinder 232 which includes at the bottom thereof piston 233. The bottom of the cylinder 230 is recessed as indicated at 234 to accommodate fasteners 235 holding the reduced diameter end portions of guide rods 236 and 237 to the bottom web or base 238 of the cylinder 230. O-rings 239 may be employed to seal the rods in the base 238. The upper ends of the rods 236 and 237 extend through partition 240 and are fastened thereto by fasteners 241. Again, O-ring seals may be provided as at 242 around the reduced diameter portions of the rods within the partition 240. The piston 233 is provided with packing glands 243 surrounding each of the polished large diameter portions of the rods 236 and 237, and the partition 240 is provided with piston rings 244 while the lower end of the cylinder 232 is provided with piston rings 245. The rings 244 provide a sliding but not necessarily guiding seal between the partition 240 and the interior of the cylinder 232, while the rings 245 again provide a sliding but not necessarily guiding seal between the cylinders 232 and 230.

A table 247 is secured on the flanged upper end of the cylinder 232 and a large diameter O-ring 248 may seal the two together so that the table provides an air-tight piston closure for the upper end of the cylinder 232. Mounted on the table 247 is a pattern plate 249 and a pattern P which when elevated will close the bottom of the flask F.

In operation, the table 247 will be elevated to pick up the flask F from the conveyor rollers 227 and 228 and to cause the fill frame 220 to engage the top of the flask. When this has been accomplished, the mold box is assembled and the piston-cylinder assembly 205 will be retracted to place the sand chute 203 above the assembled mold box extending vertically between the measuring box 193 and the mold box. With the cut-off plates 185 and 186 closed, the piston-cylinder assembly 197 will now be retracted opening the louver gate 195 to dump by gravity the amount of sand within the measuring box 193 into the mold box. When the mold box is thus filled, the piston-cylinder assembly 205 will be extended replacing the chute 203 with the squeeze head assembly 202 and the strike-off blade or wiper 211 will remove excess sand from the top of the mold box.

With the squeeze head assembly 202 in proper position, the table 247 will now further be elevated at high squeeze pressure to cause the sand-filled mold box to move upwardly against the squeeze head with the latter telescoping within the fill frame 220 to squeeze the sand within the flask. When the proper ramming of the sand-filled flask has been obtained, the table 247 will be lowered automatically separating the fill frame 220 frame the flask F and further lowering of the table will draw the pattern P from the now rammed mold within the flask. The mold within the flask is then deposited on the conveyor rollers 227 and 228 to be shuttled from the machine.

To obtain elevation of the table air may be supplied through port 251 in the rod 236 to the chamber 252 above the partition 240 and also through port 253 to the chamber 254 beneath the piston 233. For the initial elevation of the table to assemble the mold box, the air pressure need only be supplied to one or the other to obtain a low or medium elevation pressure and a stop latch mechanism may be employed to hold the assembled mold box in vertical position while being filled with sand. When released, air may be supplied through both ports to both chambers to obtain the high pressure squeeze. To lower the table rapidly, air may be supplied through port 255 in the rod 237 connected to chamber 256 while ports 251 and 253 are vented. It will be appreciated that by proper valving, the rate of descent of the table 247 may be closely controlled.

Since three pressure selections are available, i.e., by pressurizing the smaller diameter chamber 252, then the larger diameter chamber 254, and then both, it may be desirable to apply such pressures in that order. The low pressure application may be utilized in the assembling of the mold box and the medium pressure application may be utilized in the initial squeeze operation with the final high pressure application being employed to obtain the final high pressure squeeze. The intermediate application of medium pressure will give the diaphragm 213 time to adjust and conform thereby distributing the pressure more evenly over the entire top of the mold. Reference may be had to the aforementioned application of Edmond K. Hatch et al. entitled "Squeeze Molding Machine," Ser. No. 127,616, filed July 28, 1961, now Patent No. 3,220,066, for a more clear disclosure of the general type of machine illustrated in FIG. 5.

It can now be seen that there is provided with the present invention fluid pressure operated squeeze molding machines which can obtain higher pressures with smaller squeeze piston assemblies. Moreover, in a pneumatic machine, high squeeze pressures can be obtained with a pneumatic system providing a completely air-operated machine with the air being available readily from plant sources. With the tandem squeeze arrangement, the applicable squeeze pressures may be substantially doubled, with the illustrated embodiments, and it will be appreciated that additional pistons and partitions properly supported will substantially triple or quadruple the pressures available. Moreover, since the stroke of the assembly is guided by the polished large diameter portions of the guide rods, the cylinders and pistons are not required to be carefully machined and finished to provide both a slide and guide surface. In this manner substantial economies in production can be obtained.

Other modes of applying the priciples of the invention may be employed, change being made as regards the details described, provided the features stated in any of the following claims or the equivalent of such be employed.

We, therefore, particularly point out and distinctly claim as our invention:

1. A foundry molding machine comprising means operative to assemble a pattern and flask to form a mold box, means to fill such box with molding sand, a squeeze head operative to engage such sand within said box, and a fluid pressure operated squeeze assembly operative relatively to move said head and sand filled flask to ram a foundry mold therein, said assembly including tandemly connected pressure receiving surfaces operative to increase substantially the squeeze pressure obtainable, said assembly including relatively movable telescoping cylinders, and said cylinders being mounted for relative movement on a plurality of guide rods extending axially thereof.

2. A foundry molding machine as set forth in claim 1 wherein said assembly comprises inner and outer telescoping cylinders, a piston in said cylinder connected to said outer cylinder, and means operative to supply fluid under pressure to the inside of said inner cylinder on one side of said piston and to said outer cylinder on one side of said inner cylinder to cause relative movement of said cylinders.

3. A foundry molding machine as set forth in claim 1 wherein said assembly is connected to said squeeze head and moves the latter against such sand within said box.

4. A foundry molding machine as set forth in claim 1 wherein said assembly supports said sand filled flask and is operative to elevate the latter against said squeeze head.

5. A foundry molding machine as set forth in claim 1 wherein said assembly includes a cylinder having a partition therein with said surfaces being on opposite sides of said partition.

6. A foundry molding machine comprising means operative to assemble a pattern and flask to form a mold box, means to fill such box with molding sand, a squeeze head operative to engage such sand within said box, and a fluid pressure operated squeeze assembly operative relatively to move said head and sand filled flask to ram a foundry mold therein, said assembly including stacked pressure receiving surfaces operative to increase the squeeze pressure obtainable without increasing the lateral size of the assembly, said stacked surfaces being slide guided by a polished guide rod extending axially of said assembly.

7. A foundry molding machine as set forth in claim 6 wherein said assembly is connected to said squeeze head and is operative to drive the latter into the sand filled flask.

8. A foundry molding machine as set forth in claim 6 wherein said assembly is connected to the sand filled flask and is operative to drive the latter against said squeeze head.

9. A squeeze assembly for foundry molding machines comprising relatively movable telescoping cylinders, a partition within the inner cylinder partitioning said cylinder into two compartments, said inner cylinder being closed at both ends, and means operative to pressurize both ends of said inner cylinder in the same direction thereby to obtain such relative movement, said inner cylinder being fixed and the outer cylinder moving thereover.

References Cited

UNITED STATES PATENTS

| | | | |
|---|---|---|---|
| 2,956,317 | 10/1960 | Peasley | 22—31 X |
| 3,169,285 | 2/1965 | Hatch et al. | 22—41 X |
| 3,220,317 | 11/1965 | Fuell | 92—76 X |

FOREIGN PATENTS

| | | |
|---|---|---|
| 420,424 | 11/1934 | Great Britain. |
| 1,142,219 | 1/1963 | Germany. |

J. SPENCER OVERHOLSER, *Primary Examiner.*

E. MAR, *Assistant Examiner.*